(12) United States Patent
Jannson et al.

(10) Patent No.: US 6,295,405 B1
(45) Date of Patent: Sep. 25, 2001

(54) LIGHT PIPE FOR A BACKLIGHTING SYSTEM

(75) Inventors: Tomasz P. Jannson; Stephen A. Kupiec, both of Torrance; Jeffrey A. Laine, Redondo Beach; Michael Rud, Woodland Hills; Anatoly Vasiliev, Torrance, all of CA (US)

(73) Assignee: Physical Optics Corporation, Torrance, CA (US)

( * ) Notice: Subject to any disclaimer, the term of this patent is extended or adjusted under 35 U.S.C. 154(b) by 0 days.

(21) Appl. No.: 09/137,549

(22) Filed: Aug. 20, 1998

Related U.S. Application Data

(63) Continuation-in-part of application No. 08/900,890, filed on Jul. 25, 1997, now Pat. No. 5,995,742.

(51) Int. Cl.[7] .......................... G02B 6/10; G02F 1/13357
(52) U.S. Cl. .......................... 385/146; 385/133; 385/901; 362/31; 362/561; 349/65
(58) Field of Search ........................... 385/146, 901, 385/133, 121; 349/65, 62; 362/26, 31, 561, 554, 556, 558; 40/546, 547

(56) References Cited

U.S. PATENT DOCUMENTS

| | | |
|---|---|---|
| 4,043,636 | * 8/1977 | Eberhardt et al. . |
| 4,870,484 | * 9/1989 | Sonehara . |
| 4,915,479 | * 4/1990 | Clarke . |
| 5,233,679 | * 8/1993 | Oyama .................................. 385/146 |
| 5,363,294 | * 11/1994 | Yamamoto et al. .................. 362/330 |
| 5,613,751 | * 3/1997 | Parker et al. .......................... 362/31 |
| 5,921,651 | * 7/1999 | Ishikawa .............................. 362/31 |

FOREIGN PATENT DOCUMENTS 3-85520 * 4/1991 (JP) .

* cited by examiner

Primary Examiner—Rodney Bovernick
Assistant Examiner—Michael J Stahl
(74) Attorney, Agent, or Firm—Nilles & Nilles, S.C.

(57) ABSTRACT

A non-scattering light pipe includes a transition surface between a first side wall and an input surface and a second side wall and the input surface. The transition surface is arranged to substantially obscure the corner interfaces between the first and second side walls and the input surface such that in the corner formation any imperfections therein are not imaged into the output. Most preferably, the transition surface is optimized to provide a substantially uniform light intensity distribution. A light pipe in accordance with the preferred embodiments of the present invention is further arranged to couple to a linear light source, such as a cold cathode fluorescent light (CCFL). The light source is arranged such that dim areas, i.e., areas of the light source having non-uniform intensity, are not disposed adjacent the input surface.

38 Claims, 5 Drawing Sheets

LIGHT PIPE FOR A BACKLIGHTING SYSTEM

CROSS-REFERENCE TO RELATED APPLICATIONS

The present invention is a continuation-in-part of commonly assigned U.S. patent application Ser. No. 08/900,890, filed Jul. 25, 1997 and entitled "Method of Rapid Prototyping for Multifaceted And/Or Folded Path Lighting Systems," now U.S. Pat. No. 5,995,742 the entire disclosure of which is hereby expressly incorporated herein by reference.

BACKGROUND OF THE INVENTION

1. Field of the Invention

The present invention relates generally to a light pipe for a backlighting system such as is used in backlighting a flat panel liquid crystal display (LCD), and more particularly, to a non-scattering backlighting system having an optical input arranged to provide a uniform light distribution to the LCD.

2. Description of the Related Art

Flat panel displays, such as LCDs used in laptop computers, generally incorporate a backlighting system to illuminate a liquid crystal based display panel. Important requirements of the backlighting system are to provide a substantially uniform light distribution and to provide a sufficiently intense light distribution over the entire plane of the display panel. To accomplish these requirements, the backlighting system typically incorporates a light pipe to couple light energy from a light source to the LCD panel.

In scattering backlighting systems an array of diffusing elements are disposed along one surface of the light pipe to scatter light rays incident thereto toward an output plane. The output plane is coupled to the LCD panel, coupling the light rays into and through the LCD panel. While a scattering backlighting system offers the ability, by controlling the distribution of the scattering media on the scattering surface, to control the light distribution, it does not offer an ability to control the angle of light distribution. Much of the light energy produced by the backlighting system is wasted because it is scattered in directions that are not useful to the LCD display user. Because much of the light energy is not directed to the user and is thus wasted, scattering backlighting systems lack the desired light energy intensity or brightness.

A non-scattering backlighting system is disclosed and described in the aforementioned commonly assigned U.S. Pat. No. 5,995,742. Non-scattering backlighting systems offer the advantage that both the light distribution and the angle of distribution may be controlled. Thus, the light energy may be directed in a way to make more efficient use of the available light energy, i.e., to direct substantially all of the light energy toward the user. A term often used to describe non-scattering backlighting systems is "deterministic" because the output point of a light ray is known based upon its input position. Thus, it may be said that a non-scattering backlighting system correlates the rays of input light energy and the rays of output light energy.

This correlation is advantageously used in the design of the backlighting system to ensure that a majority of the light energy is directed to the user. The correlation of input light rays to output light rays in a non-scattering backlighting system may also lead to a potential disadvantage arising from imaging at the light input appearing at the light output. If there is any distortion of the light energy at the input, this distortion will also appear at the output. The distortion may result from roughness or discontinuities in the light source or the input optics. Generally such distortions will result in an area of non-uniform light intensity or a shadow in the output. Another source of distortion is the walls of the light pipe perpendicular to the light source. The walls must be made extremely smooth and flat or else they result in a distortion or shadow in the output.

A particular distortion that is observed in non-scattering backlighting systems is the formation of a diagonal line across the output plane of the backlight. It has been observed that distortions of the corner interface of the side wall to the input surface of the light pipe, due to manufacturing limitations in the construction of the light pipe, are imaged in the output as a dark, diagonal line. While it is possible to polish and smooth the surfaces to reduce the appearance of the distortion, these operations are labor intensive and therefore impractical in the mass production of light pipes.

Additionally, it has been observed that non-uniformity in the output of the cold cathode fluorescent light (CCFL) source may cause distortions and shadows in the output. More particularly, the CCFL has inherent dim regions adjacent the electrodes at each end of the CCFL tube. These dim regions are areas where the light output from the CCFL is not uniform, and the light output is substantially diminished as compared to a center section of the tube. Not only do these dim areas image into the output plane, but they also contribute to and exacerbate the appearance of the diagonal line.

Thus, there is a need for an improved light pipe and backlighting system.

SUMMARY OF THE INVENTION

The present invention provides a light pipe for a backlighting system. The light pipe includes an input surface, a substantially planar back surface, a substantially planar top surface, and a first side surface and a second side surface. The top surface is arranged substantially parallel or at an angle to the back surface and in spaced relation thereto, and the input surface, the first side surface, and the second side surface are disposed between the top surface and the bottom surface defining a cavity between the back surface and the top surface. Each side wall surface interconnects with the input surface at a transition surface. The transition surface is curved to optimize light distribution density in the output and to reduce distortion in the input.

In an alternate preferred embodiment of the present invention, the transition surface is arranged to preserve total internal reflection over its entire surface. In this manner, the transition surface is preferably arranged as a compound hyperbolic curve extending from the side surfaces to the input surface.

In still another preferred embodiment of the present invention, the transition surface is arranged to optically obscure, from the output, an intersection between the input surface and each of the first side surface and the second side surface.

Also, and in accordance with the present invention, the transition surface is optimized to obtain the principal characteristics of the present invention using ray tracing techniques including inverse ray tracing techniques.

In particular embodiments of the present invention, the light pipe may be arranged to couple to a LCD device, and in this regard, the light pipe operates as a backlighting device.

In another aspect of the present invention, a backlight system includes a light pipe constructed in accordance with the principles of the present invention. A linear light source is coupled adjacent the input surface. The linear light source includes at least one region of non-uniform light distribution. The light pipe and the light source are arranged to ensure that the region of non-uniform light distribution does not lie adjacent an input of the light pipe.

In one preferred embodiment of the present invention, the light source is a cold cathode fluorescent light. The region of non-uniform light distribution is the two dim regions adjacent the electrodes. In accordance with the present invention, the light source is made longer than a length of the input surface such that the dim regions are disposed, respectively, beyond a first end and a second end of the input surface.

Other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

1. Resume

A non-scattering light pipe includes a transition surface between a first side wall and an input surface and a second side wall and the input surface. The transition surface is arranged to substantially obscure the corner interfaces between the first and second side walls and the input surface such that any imperfection in the corner formation is not imaged into the output. Most preferably, the transition surface is optimized to provide a substantially uniform light intensity distribution. A light pipe in accordance with the preferred embodiments of the present invention is further arranged to couple to a linear light source, such as a cold cathode fluorescent light (CCFL). The light source is arranged such that dim areas, i.e., areas of the light source having non-uniform intensity, are not disposed adjacent the input surface. A typical CCFL light source has two dim areas located at its ends adjacent the electrodes, and in this regard, the light source is constructed such that the electrodes and the associated dim areas are disposed beyond the ends of the input surface. Most preferably, the electrodes and dim areas are disposed beyond an extended portion of the input surface formed to accommodate the transition surfaces.

2. Light Pipe

Figure 1:
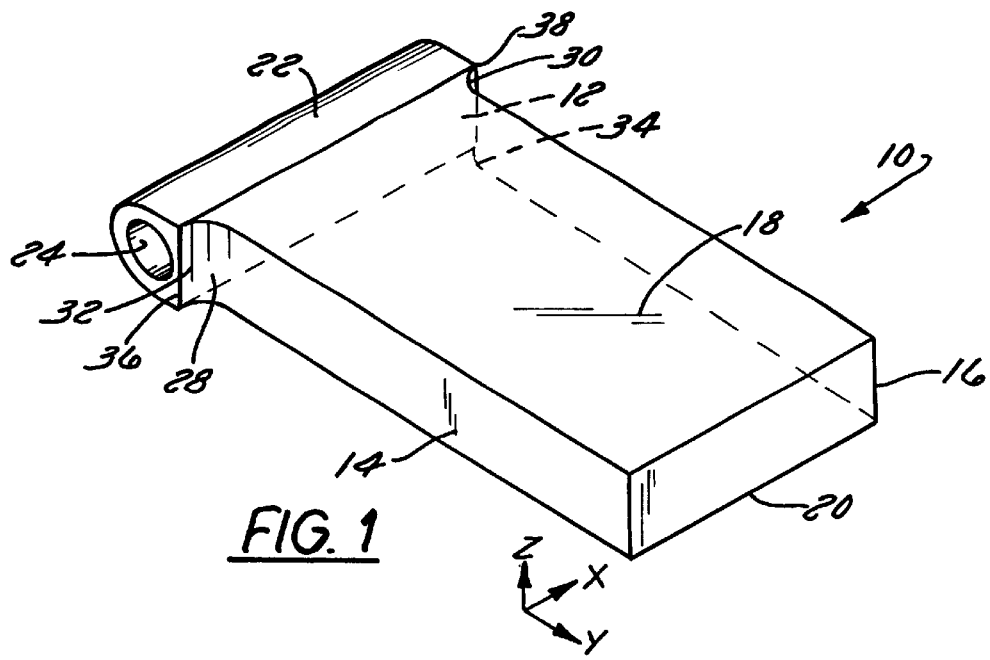
FIG. 1 a perspective view of a light pipe in accordance with a preferred embodiment of the present invention.
Figure 2:
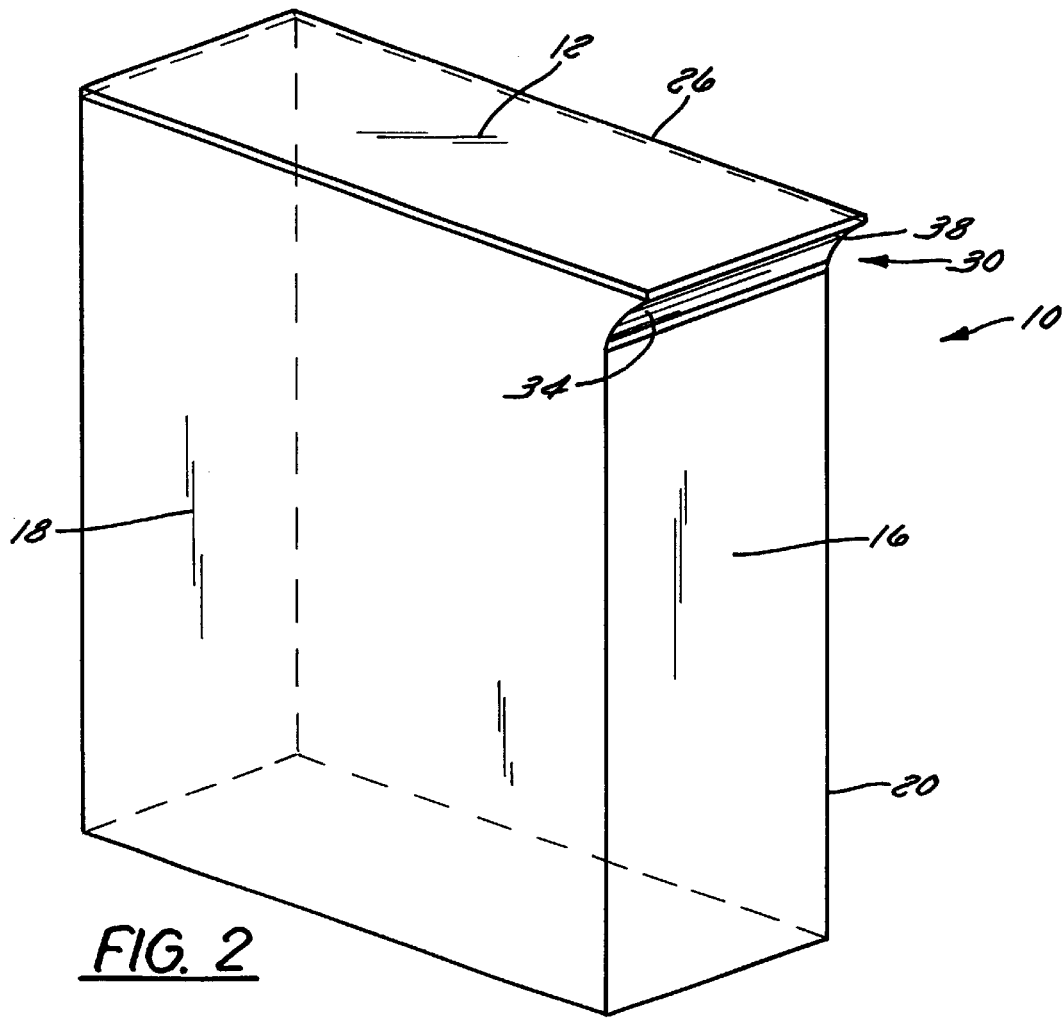
FIG. 2 is a schematic perspective illustration of a portion of the light pipe shown in FIG. 1.

Referring to FIG. 1 and FIG. 2, a light pipe 10 in accordance with a preferred embodiment of the present invention includes an input surface 12, a first side wall 14, a second side wall 16, an output surface 18, and a bottom surface 20. Light pipe 10 is shown coupled to a light source collimator 22 having an aperture 24 formed therein for receiving a linear light source, for example, a cold cathode fluorescent light device. In FIG. 2, a substantially uniform light source is illustrated as a plane 26. As described more fully in the aforementioned U.S. Pat. No. 5,995,742, light energy is coupled from the light source into light pipe 10 via input surface 12. Bottom surface 20 is formed with an array of facets or light redirecting structures that reflect, without scattering, the light energy in a controlled, substantially uniform distribution through the output surface 18 as disclosed in commonly owned U.S. Pat. No. 5,838,403, incorporated herein by reference. The light energy is, preferably, communicated within light pipe 10 in accordance with the principle of total internal reflection.

Light pipe 10 may be considered deterministic. That is, every light ray exiting output surface 18 may be traced to an input light ray at input surface 12. As a result, however, any imperfection in light pipe 10, and particularly at input surface 12, will be imaged, i.e., appear as an objectionable area of non-uniform light intensity, at output surface 18. A particular source of imperfections in prior art light pipes is the interface of the side wall with the input surface.

With continued reference to FIGS. 1 and 2, and in accordance with a preferred embodiment of the present invention, light pipe 10 is formed to include a first transition surface 28 joining first side wall 14 with input surface 12 and a second transition surface 30 joining second side wall 16 with input surface 12. Each of first transition surface 28 and second transition surface 30 has a generally convex surface 32 and 34, respectively, and functions to obscure the interface 36 and 38, respectively, formed between transition surface 28 and input surface 12 and transition surface 30 and input surface 12.

Figure 3:
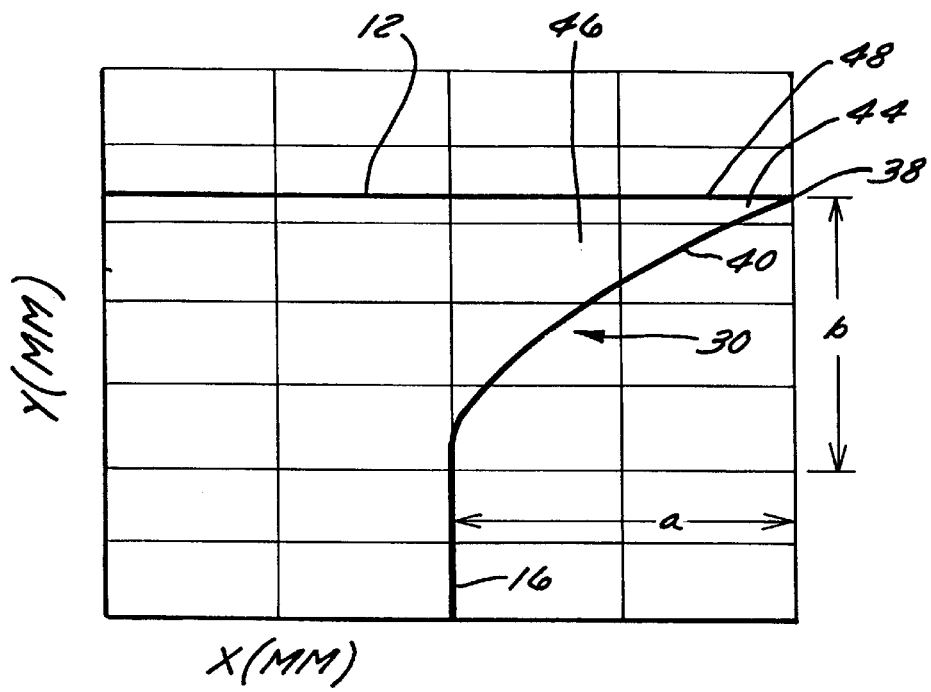
FIG. 3 is a front view of a portion of the light pipe shown in FIG. 1, better illustrating the transition surface.

Second transition surface 30 is shown in FIG. 3 and discussed below. It will be appreciated that first transition surface 28 is preferably symmetrical in configuration. Second transition surface 30 is formed to include a monotonically increasing tangent 40. As illustrated in FIG. 3, tangent 40 extends from a corner 44 at input surface 12 to second side wall 16, at which point tangent 40 is substantially parallel to a side surface 42 formed on an inner portion of second side wall 16. A region 46 is also defined by second transition surface 30 extending beyond side wall 16, and input surface 12 includes an extended portion 48 joining to transition surface 30 at interface 38.

As noted above, one impractical solution to the problem of imaging imperfections in the interface of the side wall and the input surface is to ensure that the interface is formed as a nearly perfect corner without any distortions. To even come close to achieving such an interface would require extremely precise manufacturing processes and very likely manual, labor-intensive polishing operations. In accordance with the present invention, a more practical solution is to make the interface essentially invisible. In this regard, and as shown in the Figures, each transition surface is arranged such that the interface between the transition surface end and the input surface is substantially obscured from the output viewing area. That is, with reference again to FIG. 3, transition surface 30 extends interface 38 outwardly away from the output viewing area. Arranging transition surface 30 in this manner ensures that any distortion in interface 38 is not imaged into the output. The transition surface 30 can then have a smooth surface finish and/or can have a polished surface finish. The transition surface 30 can also be optimized to minimize a root-mean-square (RMS) intensity non-uniformity at an observation plane.

Transition surface 30 is further optimized to provide a substantially uniform light distribution. In accordance with a preferred embodiment of the present invention, transition surface 30 is formed as a compound hyperbolic curve in accordance with the equation:

$$\frac{x^2}{a^2} - \frac{y^2}{b^2} = 1 \tag{a}$$

where "x" and "y" are as indicated in FIG. 3, and "a" and "b" are constants chosen to optimize the uniformity of the light distribution intensity. Preferably with a=1, b is selected in the range of about 0.9 to about 1.5. It will be apparent that relative coordinate references of various light pipes may require the addition of offset constants to equation (a). Equation (b) represents a form of equation (a) including an offset of "$2a$" in the x direction:

$$\frac{(x-2a)^2}{a^2} - \frac{y^2}{b^2} = 1. \tag{b}$$

Transition surface 30 formed in accordance with equation (a) or equation (b) advantageously provides substantially uniform light distribution and maintains total internal reflection (TIR) conditions over its entire surface. It will be appreciated that other transition surface configurations may be used without departing from the fair scope of the present invention. For example, a simple radial taper may be employed with some success in improving uniformity by obscuring the interface between the side wall surfaces and the input surface. However, a simple radial taper does not preserve TIR conditions over its entire surface leading to additional sources of non-uniformity. In addition, the surface curvature itself may also introduce non-uniformity.

Figure 4:
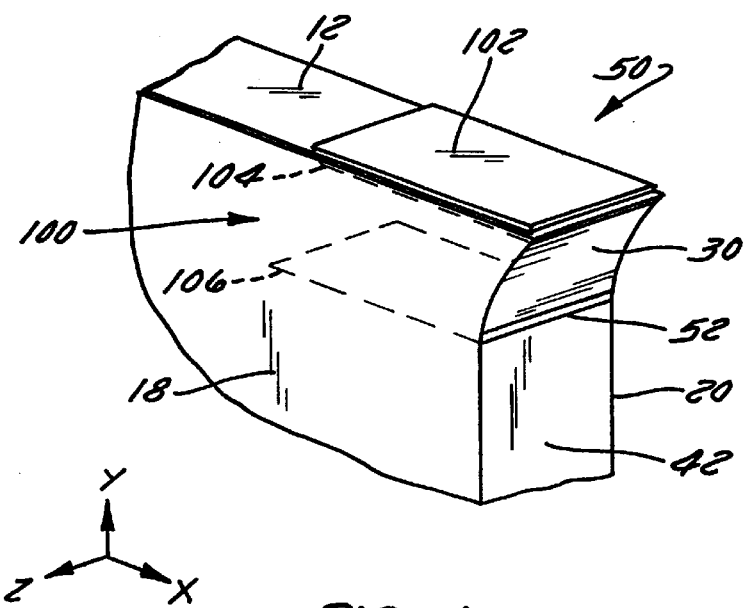
FIG. 4 is a schematic perspective illustration of a portion of a light pipe in accordance with the preferred embodiment of the present invention and further illustrating an arrangement for optimizing a light pipe in accordance with a preferred embodiment of the present invention.
Figure 5:
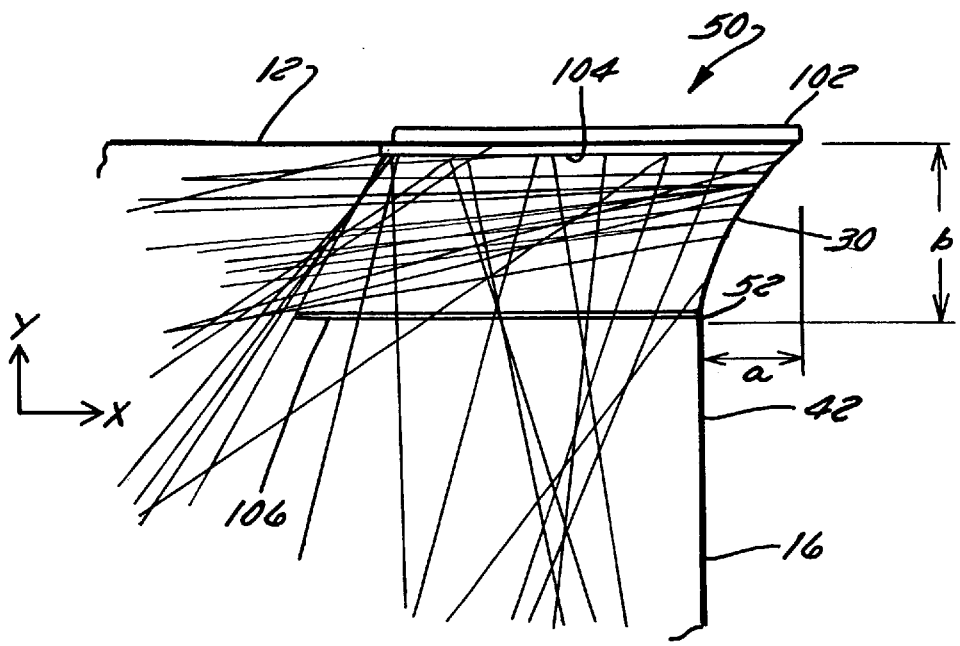
FIG. 5 is a schematic front view of the light pipe and optimizing arrangement shown in FIG. 4 and further illustrating the results of ray tracing.

In accordance with the present invention, transition surface 30 is optimized using ray tracing techniques. With reference to FIGS. 4 and 5, an arrangement 100 for optimizing transition surface 30 using ray tracing is shown. A collimated light source 102 is modeled and disposed opposite input surface 12 generally at region 50. A lambertian diffuser 104 is modeled and disposed between light source 102 and input surface 12. Finally, a theoretical output plane 106 is modeled generally about the intersection 52 of transition surface 30 with side surface 42. The ray trace results are shown in FIG. 5. A 31×11 array tracing 100,000 rays was used. Of note in FIG. 5 is the fact that TIR conditions are maintained over the entirety of transition surface 30.

Figure 6:
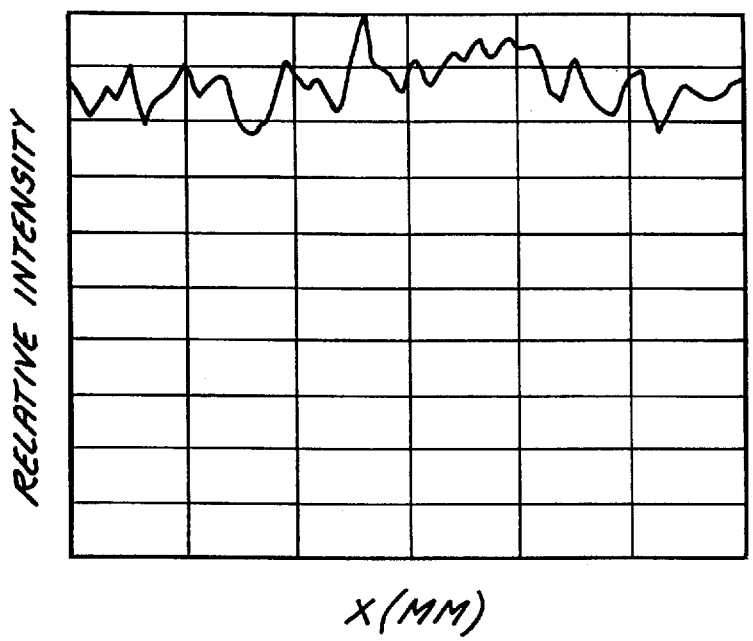
FIG. 6 is graph illustrating a ray tracing intensity distribution of the light pipe shown in FIG. 4.
Figure 7:
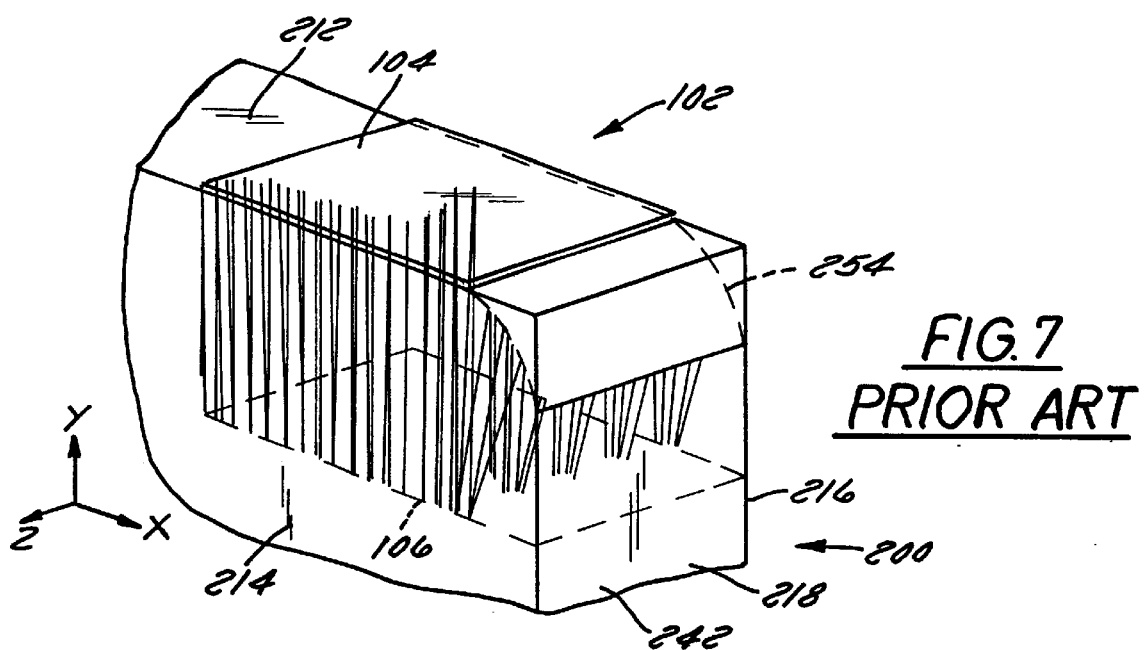
FIG. 7 is a schematic perspective view of a portion of a light pipe in accordance with the prior art.
Figure 8:
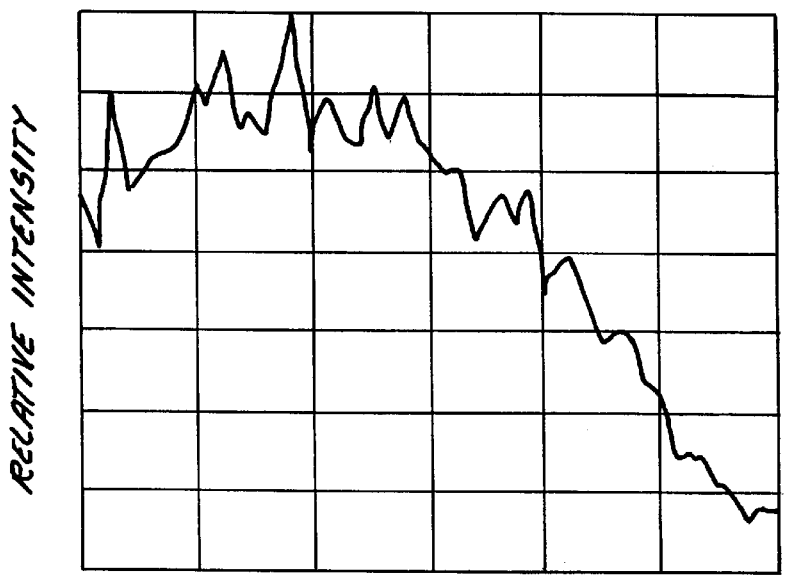
FIG. 8 is a graph illustrating a ray tracing intensity distribution of the prior art light pipe shown in FIG. 7.

FIG. 6 illustrates the results of the ray tracing in graphic form. As can be seen in FIG. 6, a substantially uniform intensity is produced by transition surface 30. It is useful to provide a comparison with the prior art, and with reference to FIGS. 7 and 8 (appropriately labeled "prior art"), a light pipe 200 includes an input surface 212, an output surface 214, a bottom surface 216, and a side wall 218 having a side surface 242. A radial corner 254 is provided between side wall 218 and input surface 212. Corner 254 thus represents a corner that may generally be formed between a side wall and the input surface of a light pipe. The radius of corner 254 was modeled as 1 mm. FIG. 8 illustrates in chart form the intensity distribution. Note that the intensity increases to a maximum approaching the comer and then substantially decreases immediately adjacent the comer. The output of this arrangement is highly non-uniform as can be plainly seen by the shape of the curve. FIGS. 7 and 8 also highlight another shortcoming of the prior art and a benefit of the present invention. That is, the benefit of the present invention, unlike in the prior art, of forming transition surface 30 to extend outward of sidewall 16 so that the actual interface of transition surface 30 with input surface 12 is substantially obscured. Otherwise, curvature of the transition surface, failure to maintain TIR conditions, and imperfections in the interface itself will lead to a non-uniform intensity distribution.

3. Backlight Including Light Pipe

Figure 9:
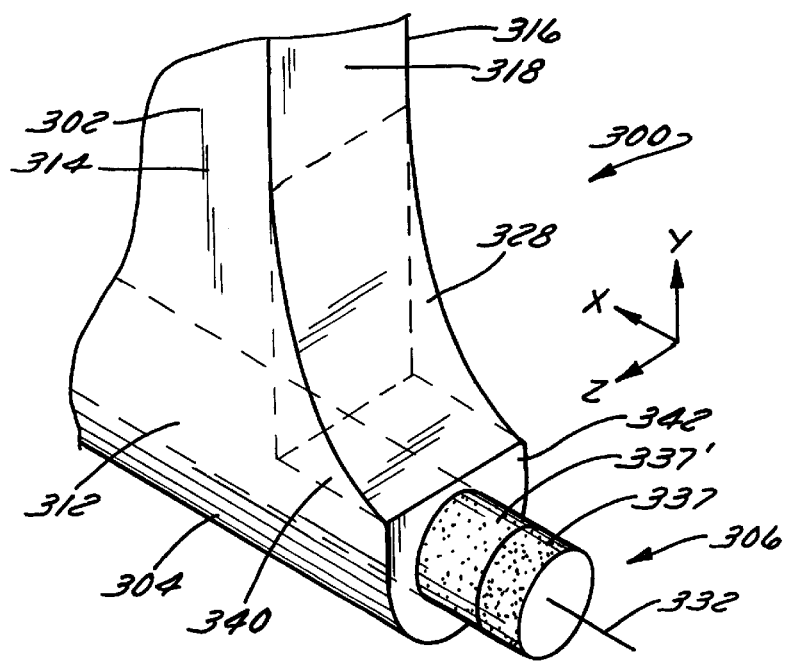
FIG. 9 is a perspective view of a backlight incorporating a light pipe in accordance with preferred embodiments of the present invention.
Figure 10:
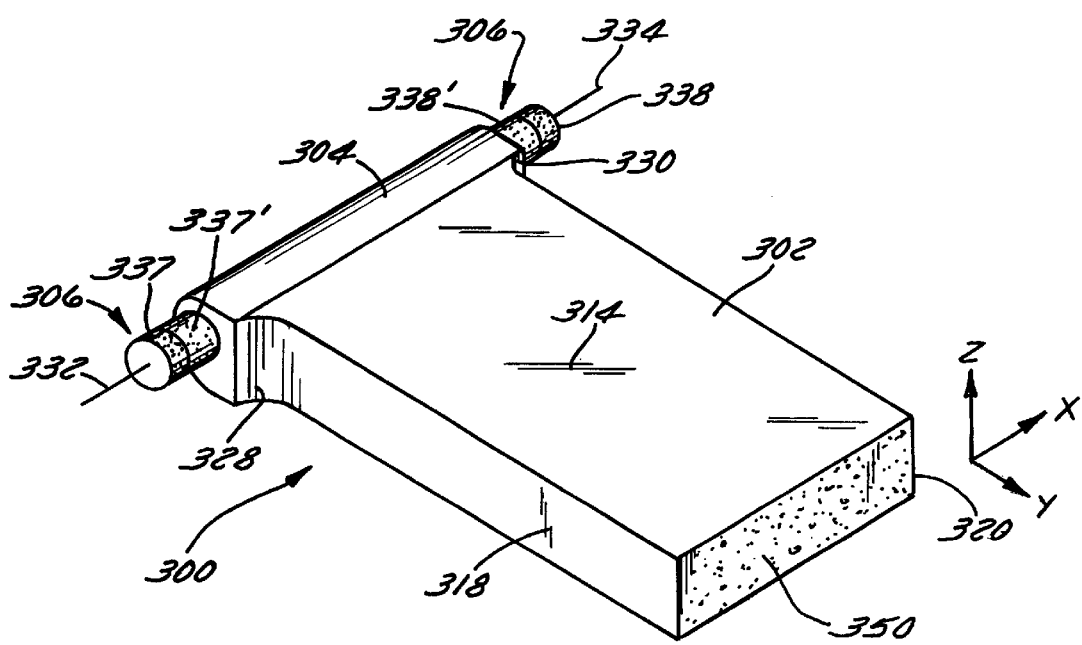
FIG. 10 is an enlarged, partial perspective view of the backlight shown in FIG. 2 illustrating aspects of a preferred light pipe and a preferred arrangement for the light source.

Referring now to FIGS. 9 and 10, a backlight 300 in accordance with a preferred embodiment of the present invention includes (1) a light pipe 302, (2) a collimating assembly 304, and (3) a light source 306. Light pipe 302, in use, will preferably be mounted within a frame (not shown) along with and behind an LCD (not shown). Light source 306 is preferably one (or more) CCFL device. Collimating assembly 304 collimates light from light source 306 and directs the light into the light pipe 302. Light pipe 302 provides a uniformly distributed source of light energy to illuminate, for example, the backlight or liquid crystal display.

Light pipe 302 is formed substantially in accordance with light pipe 10 described above, and includes (1) an input surface 312, (2) an output surface 314, (3) a bottom surface 316, (4) a first side wall 318, (5) a second side wall 320, (6) a first transition surface 328, and (7) a second transition surface 330. Light source 306 includes a first electrode 332 and a second electrode 334 disposed on opposite ends of the light source, as is well known in the art. Being a CCFL device, light source 306 is also hindered in that adjacent first electrode 332 and second electrode 334 are dark regions 337 and 338, and dim regions 337' and 338', respectively.

As seen in FIGS. 9 and 10, light source 306 is positioned within collimating assembly 304 such that dim regions 337' and 338' are not adjacent input surface 312. More particularly, dim region 337' is positioned beyond an extended portion 340 of input surface 312, and likewise, beyond an interface 342 of input surface 312 with first transition surface 328. Thus, dim regions 337' and 338' are not imaged onto output surface 314 and do not cause an area of non-uniform illumination.

As further seen in FIG. 10, back surface 350 may be a reflective surface including a reflective scattering surface, or a partially absorptive surface, to further reduce nonuniformity.

Many changes and modifications could be made to the invention without departing from the fair scope and spirit thereof. The scope of some changes is discussed above. The scope of others will become apparent from the appended claims.

We claim:

1. A light pipe for a backlighting system, said light pipe comprising:
   an input surface, a substantially planar back surface, a substantially planar top surface, and a first side surface and a second side surface, said top surface arranged substantially parallel to said back surface and in spaced relation thereto, and said input surface, said first side surface, and said second side surface disposed between said top surface and said back surface,
   each said side surface interconnecting with said input surface at a transition surface, each said transition surface curved to optimize light distribution density and to optically obscure an intersection between said input surface and each said first side surface and said second side surface.

2. The light pipe of claim 1, wherein each said transition surface comprises a concave surface between said input surface and respectively, said first side surface and said second side surface.

3. The light pipe of claim 1, wherein each said transition surface comprises a concave surface with a monotonically increasing tangent extending from said input surface and joining, respectively, said first side wall and said second side wall.

4. The light pipe of claim 1, wherein each said transition surface comprises a hyperbolic surface.

5. The light pipe of claim 1, wherein said transition surface comprises a hyperbolic surface in accordance with the equation:

$$\frac{x^2}{a^2} - \frac{y^2}{b^2} = 1$$

where "b" is chosen to be between 0.9 and 1.5.

6. The light pipe of claim 5, wherein a=1.

7. The light pipe of claim 5, wherein a=b=1.

8. The light pipe of claim 1, wherein said transition surface comprises a hyperbolic surface in accordance with the equation:

$$\frac{(x-c)^2}{a^2} - \frac{(y-d)^2}{b^2} = 1$$

where "c" and "d" are offset constants.

9. The light pipe of claim 1, said back surface and said top surface having a common width, and said input surface having a length wider than said width.

10. The light pipe of claim 1, wherein each said transition surface is arranged normal to said top surface.

11. The light pipe of claim 1, wherein each said transition surface has a smooth surface finish.

12. The light pipe of claim 11, wherein each said transition surface has a polished surface finish.

13. The light pipe of claim 1, wherein each said transition surface is optimized for substantially uniform light distribution using ray tracing.

14. The light pipe of claim 13, wherein said ray tracing comprises inverse ray tracing.

15. The light pipe of claim 13, wherein each said transition surface is optimized based upon an output intensity distribution at an observation plane arranged parallel to said input surface.

16. The light pipe of claim 15, wherein each said transition surface is optimized to minimize an RMS intensity non-uniformity at said observation plane.

17. The light pipe of claim 1, further comprising said light pipe coupled to a light source at said input surface and to a liquid crystal display at said top surface.

18. The light pipe of claim 17, said light source comprising at least one region of non-uniform light distribution intensity, said at least one region disposed beyond a respective one of said transition surfaces.

19. The light pipe of claim 17, said light source comprising a linear light source having a first end and a second end and a region of substantially uniform light distribution intensity disposed between said first end and said second end, said region being arranged adjacent said input surface and said first end and said second end being disposed beyond each said transition surface, respectively.

20. A backlight comprising:
    a light pipe having a bottom surface, a top surface, a back surface, and an input surfaced;
    a linear light source coupled adjacent said input surface, wherein said input surface has an input surface length and said light source has a light source length greater than said input surface length; and
    a first side wall and a second side wall disposed in opposing relationship between said top surface and said bottom surface, each said first side wall and said second side wall including a transition surface respectively coupling each said first side wall and said second side wall with said input surface, wherein each said transition surface is arranged to optically obscure an intersection between said input surface and each said first side wall and said second side wall.

21. The light pipe of claim 20, wherein said back surface is reflective scattering.

22. The backlight of claim 20, wherein said light source length comprises a region of said light source having substantially uniform illumination.

23. The backlight of claim 20, wherein said light source comprises a cold cathode fluorescent light device.

24. The backlight of claim 20, wherein said light source comprises opposed electrodes attached to and disposed respectively beyond a first end and a second end of said light source.

25. The backlight of claim 24, wherein associated with each said opposed electrode is a non-uniform illumination region, and wherein each said non-uniform illumination region is disposed respectively beyond said input surface.

26. The backlight of claim 25, wherein said non-uniform illumination regions are of unequal length.

27. The backlight of claim 25, wherein said non-uniform illumination regions are dim compared to the remainder of said light source.

28. The backlight of claim 20, further comprising said backlight coupled to a liquid crystal display at said top surface.

29. The backlight of claim 20, wherein each said transition surface comprises a hyperbolic surface.

30. The backlight of claim 20, wherein each said transition surface is arranged normal to said top surface.

31. The backlight of claim 20, wherein each said transition surface has a smooth surface finish.

32. The backlight of claim 31, wherein each said transition surface has a polished surface finish.

33. The light pipe of claim 20, wherein each said transition surface comprises a concave surface with a monotonically increasing tangent extending from said input surface and joining, respectively, said first side wall and said second side wall.

34. The backlight of claim 20, wherein each said transition surface is optimized for substantially uniform light distribution using ray tracing.

35. The backlight of claim 34, wherein said ray tracing comprises inverse ray tracing.

36. The backlight of claim 34, wherein each said transition surface is optimized based upon an output intensity distribution at an observation plane arranged parallel to said input surface.

37. The backlight of claim 36, wherein each said transition surface is optimized to minimize an RMS intensity non-uniformity at said observation plane.

38. The light pipe of claim 20, wherein each said transition surface comprises a concave surface between said input surface and respectively, said first side wall and said second side wall.

* * * * *